United States Patent
Royall

(10) Patent No.: US 7,465,224 B1
(45) Date of Patent: Dec. 16, 2008

(54) METHOD AND APPARATUS FOR REMOVING FEATHERS FROM A SEGMENTED WING

(75) Inventor: William D. Royall, Hays, NC (US)

(73) Assignee: Tyson Foods, Inc., Springdale, AR (US)

(*) Notice: Subject to any disclaimer, the term of this patent is extended or adjusted under 35 U.S.C. 154(b) by 0 days.

(21) Appl. No.: 11/970,507

(22) Filed: Jan. 7, 2008

(51) Int. Cl.
*A22C 21/02* (2006.01)

(52) U.S. Cl. ...................................................... 452/86

(58) Field of Classification Search ............. 452/82–86, 452/125, 128–130, 111–114, 138; 241/74, 241/82.3, 24, 23, 247
See application file for complete search history.

(56) References Cited

U.S. PATENT DOCUMENTS

| | | | |
|---|---|---|---|
| 2,477,289 A * | 7/1949 | De Moss ..................... 452/130 |
| 2,881,469 A * | 4/1959 | De Moss ..................... 452/130 |
| 3,911,530 A | 10/1975 | Kalfsbeek et al. |
| 3,959,850 A | 6/1976 | Crane |
| 4,174,551 A | 11/1979 | McKendree |
| 4,175,302 A | 11/1979 | Scheier et al. |
| 4,199,842 A | 4/1980 | Bergeron |
| 4,217,678 A | 8/1980 | Crawford et al. |
| 4,288,888 A | 9/1981 | Herolzer |
| 4,292,709 A | 10/1981 | van Mil |
| 4,329,760 A | 5/1982 | van Mil |
| 4,330,903 A | 5/1982 | Vilotti |
| 4,481,693 A * | 11/1984 | Cowie et al. ................. 452/138 |
| 4,514,879 A | 5/1985 | Hazenbroek |
| 4,524,489 A * | 6/1985 | van Mil ....................... 452/112 |
| 4,811,458 A | 3/1989 | v.d. Nieuwelaar et al. |
| 4,884,318 A | 12/1989 | Hazenbroek |
| 4,930,189 A * | 6/1990 | Woodland .................... 452/138 |
| 5,106,333 A | 4/1992 | Van Dorn et al. |
| 5,197,916 A * | 3/1993 | Orlando et al. .............. 452/125 |
| 5,637,038 A * | 6/1997 | Davis ......................... 452/130 |
| 5,733,184 A * | 3/1998 | Curry et al. .................. 452/138 |
| 5,944,595 A | 8/1999 | Prothro |
| 6,001,012 A | 12/1999 | Ford |
| 6,168,510 B1 | 1/2001 | Ford |
| 6,855,048 B2 | 2/2005 | Haley et al. |
| 6,918,825 B2 | 7/2005 | Conaway |
| 7,070,493 B2 * | 7/2006 | Hazenbroek et al. ........... 452/83 |
| 2004/0147211 A1 | 7/2004 | Mostoller |
| 2005/0085175 A1 | 4/2005 | Stoltz |
| 2005/0221744 A1 | 10/2005 | Rapp et al. |
| 2006/0183415 A1 | 8/2006 | Turner |

* cited by examiner

*Primary Examiner*—Thomas Price
(74) *Attorney, Agent, or Firm*—Mark E. Stallion, Esq.; Husch Blackwell Sanders LLP

(57) ABSTRACT

An apparatus and method utilizing multiple tiers of pinch rollers that are vertically stacked one beneath the other, where each tier is designed to receive a wing portion and convey the wing portion from one start end of the roller pair to the distal opposing exit end along the line of engagement of the roller pair. The apparatus is designed with channeling chutes proximately adjacent each exit end for each roller pair tier. The channeling chute is position to receive the wing portion as it falls off the exit end and further has a vertically oriented channel to direct the falling wing to engage the start end of the roller pair below.

25 Claims, 5 Drawing Sheets

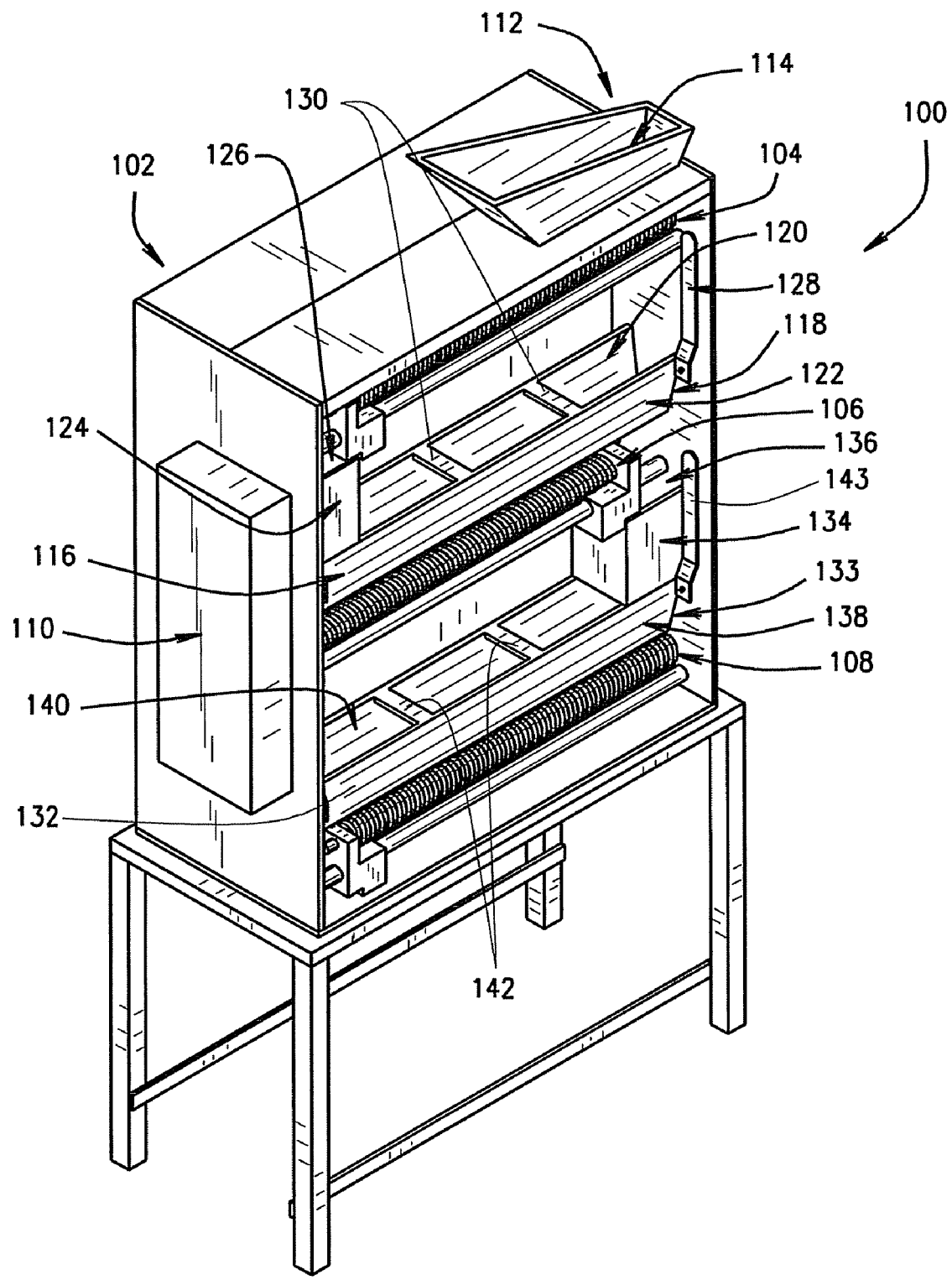
F I G . 1

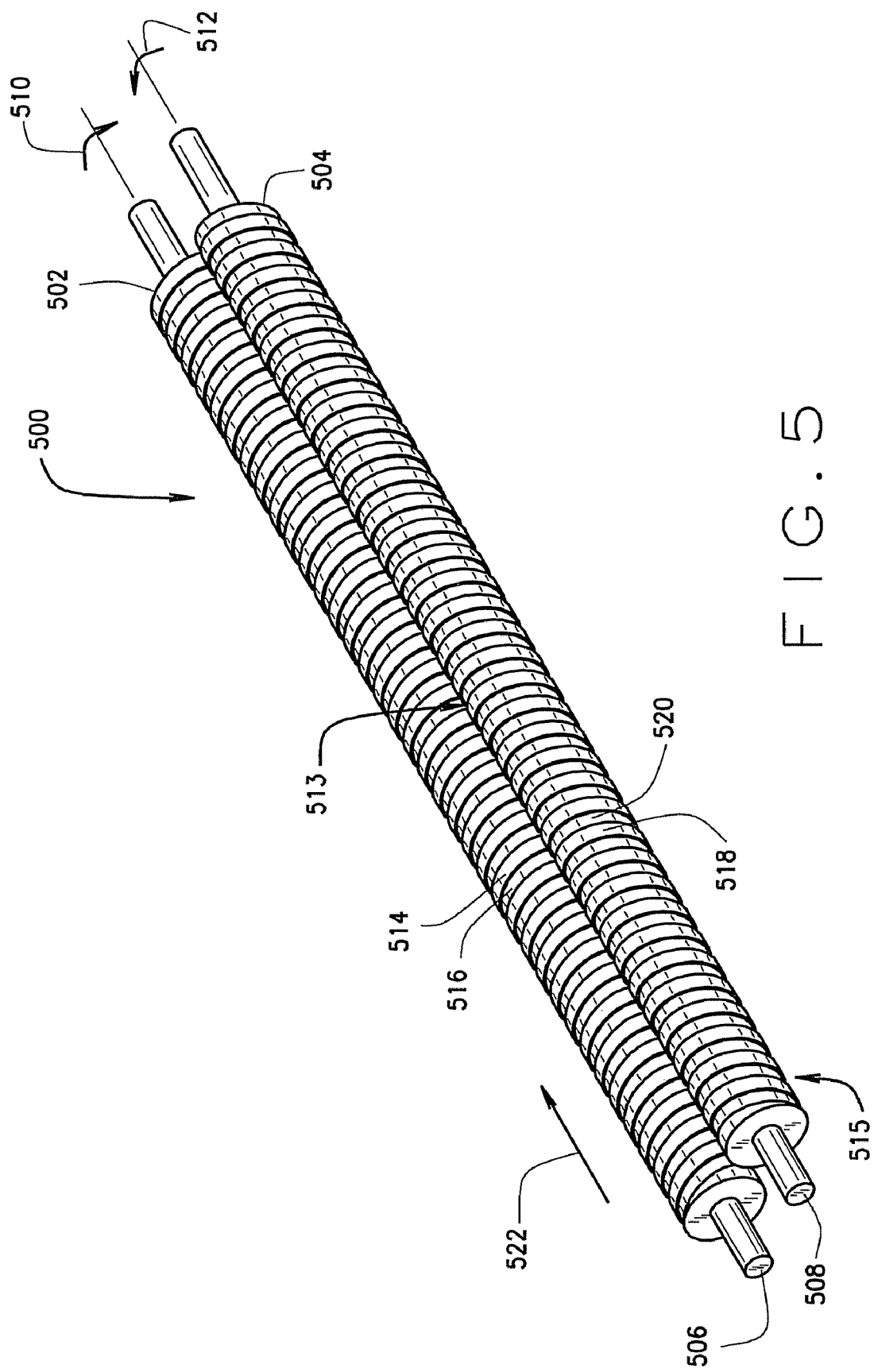

METHOD AND APPARATUS FOR REMOVING FEATHERS FROM A SEGMENTED WING

BACKGROUND OF INVENTION

1. Field of Invention

This invention relates generally to the removal of feathers from a poultry carcass and, more particularly, to removal of feathers from the wing tip of poultry.

2. Background Art

For commercially raised poultry, such as for example, chickens, turkeys, specialty hens, and etc., they are typically raised at a growing facility and then transported to processing facilities where the poultry is slaughtered and then the poultry carcass is processed for sale, where the process includes removing feathers, evisceration, and sometimes separation of parts. Feather removal is one of the initial steps in the process. There are various prior art de-feathering methods and machines, where the carcasses are first scalded with high temperature water to assist the removal of feathers and then transported through a "picking" line. A typical picking line utilizes a conveying system by which poultry carcasses are carried between or along picking devices including rotating disks or drums having rubber picking fingers extending there from, pinch rollers and etc. As the carcasses traverse the picking line, the rubber fingers or rollers or other devices contact the carcasses and capture, grasp and/or bind and pulls the feathers in some manner, thereby removing them as the carcass continues along its path of conveyance. Many of the picking devices in the prior art are intended to operate on a whole carcass prior to separation of the carcass into its piece parts.

Feathers left on birds can be a big customer complaint in the poultry industry. Excessive feathers on wing tips will cause them to be considered a downgrade whereby they cannot be sold to consumers. Feathers are hard to remove from the wing tip, tail, and shoulder/neck area. A method and apparatus for removing feathers that can be used to satisfy the customer is needed. This is particularly true for wing parts that have already been separated from the carcass. An aggressive method and apparatus is needed when removing wing feathers, which does not result in broken wings. The poultry industry has a difficult time producing enough wings to meet customer demand that will meet customer criteria. An invention is needed that will increase A-grade (highest quality) wing harvest.

Existing feather machines are called 'pickers'. Pickers have been used in poultry processing for several years. Many pickers literally beat the feathers off with rubber cones shaped like fingers. However, these devices are not very effective in removing tail or wing tip feathers. Also, usually only one bird carcass is able to be presented to the machine at a time. Some mechanical devices have been developed which are not very effective that use smooth rollers or that has rollers that look like an auger or helical gear. Many of these devices are overly aggressive and damage the carcass by pulling the carcass into the rollers. Also, many of these devices are not designed to consistently and reliably present a wing tip or tail to the rollers creating a pinch point. A better feather puller apparatus is needed particularly for removing feathers that remain on wing tips. Further, most wing tip feather removers available are designed to try to de-feather the wing while the wing remains on the carcass and while the carcass is being conveyed in overhead shackles.

Numerous feather picking devices have been disclosed and patented for overcoming certain problems associated with picking feathers from birds. These devices have been designed to be utilized with birds of different size, for continuous flow of birds into a feather plucking system, and addressing the problem associated with scarring the bird's skin by the use of a feather picking device. Although the prior art inventions are extremely useful for their stated purposes they do not overcome the problem associated with providing a feather picking device which can be used on birds of all sizes and where the wing has already been separated from the carcass.

Poultry picking machines utilizing counter-rotating picking apparatus are well known. Typically, such machines include horizontally spaced, longitudinally extending, generally parallel banks of individual cylindrical drums, one bank of drums generally opposing the other. Alternating drums in each bank are rotated in opposite directions thereby causing the flexible picking fingers attached thereto to be rotated in opposite directions against the fowl to be picked.

Typically, the mechanisms for rotating the individual drums in opposite directions have included single, elongated axles on which all of the drums have been mounted. Various drive means including belts, pulleys, or even gears have been mounted on second elongated shafts extending parallel to the single axle on which all of the drums are mounted. The second shaft is rotated in one direction with the belts or gears engaging alternating drums on the parallel axle to move those drums in the same direction as the second shaft. At the same time, a power source turns the axle on which all of the drums are mounted in a direction opposite to the direction of rotation of the second shaft causing the remaining drums which are fixed to the first axle to be rotated in an opposite direction.

However, in modern poultry processing plants the birds are typically hung or suspended in an inverted or head-down attitude from an elevated overhead conveyor and moved in sequence by the conveyor through various processing stations in which the birds are killed, de-feathered, opened and eviscerated. When the birds reach the feather removal station of the process, various devices have been used including a multiple number of flexible picking fingers, which engage the bird carcasses, pinch rollers, brushes and other feather removing mechanisms, however, these type systems usually entail complex mechanisms and are not suitable for use with wing portions that have already been separated from the carcass.

Further the above type feather picking equipment have to be adjustable to facilitate engagement of the picking mechanism with the appropriate surface area of the carcass, for example the wing tip, and the adjustability must accommodate different sized birds and other irregularly shaped birds, and if the size of the birds to be processed is changed it is necessary to reorient the positions of the picking devices or have a complex mechanization for reorienting the carcass. For example, it may be necessary to raise or to lower the picking mechanism to accommodate smaller or larger birds, or to move the picking mechanism further away from or closer to the path of travel of the birds to accommodate larger or smaller birds, and to orient the picking mechanism so as to engage the various surfaces of the birds. Further, in order to keep the fowl in proper picking orientation, the prior machines have included counter-rotating drums wherein the drums rotating downwardly are rotated faster than the drums rotating upwardly. This necessitated different driving mechanisms for the counter-rotating drums adding complexity and expense to such machines.

Regardless of the mechanization, feathers are often missed by the various apparatus. Therefore, a picking mechanism is needed that addressed the wing portion after separation and prior delivery.

BRIEF SUMMARY OF INVENTION

The invention is a method and apparatus for removing feathers from a separated poultry wing. The apparatus comprises multiple tiers of pinch rollers that are vertically stacked one beneath the other, where each tier is designed to receive a wing portion and convey the wing portion from one start end of the roller pair to the distal opposing exit end along the line of engagement of the roller pair. The apparatus is designed with channeling chutes proximately adjacent each exit end for each roller pair tier. The channeling chute is position to receive the wing portion as it falls off the exit end and further has a vertically oriented channel to direct the falling wing to engage the start end of the roller pair below. A bottom most roller pair conveys the wing portion to fall off onto a take away conveyor.

The method includes the steps of conveying a plurality of separated wing portions and channeling the separated wing portions (segmented wing) to drop and engage the start end of the upper most tier roller pair, rotating the left and right roller in opposing directions inwardly with respect to the other, thereby engaging along the line of engagement between the left and right rollers and pulling any feather from the wing tips, while simultaneously conveying the separated wing portions along the line of engaged toward the distal exit end. The method further includes the step of dropping the separated wing portions off the distal exit end and directing them to engage the next tier roller pair immediately below. This conveying, dropping and directing is repeated for each tier until the lower most tier drops the separated wing tips onto a take away conveyor.

One embodiment of the invention is a method and apparatus for removing feathers from segmented wings and specifically is a method and apparatus for removing feathers from the wing tips of poultry. This method and apparatus utilizes threaded pinch rollers running together in a series of 3 levels. Each roller within the pinch roller pair can have a helical thread where the spiral of the thread advances from a start end to an exit end which is distal from the start end. Each roller within the pinch roller pair can have threads which advance in the same direction and the two rollers of the pinch roller pair can have helical threads designs such that the ridges of one roller's helical thread can be juxtapose with respect to the valley of the other roller's helical thread. The wing tips are fed into the top level by a conveyance system and the tips travel along the pinch roller threads to the end of the rollers whereby they drop down onto the second level of pinch rollers which repeats the process through the third level. This method of dropping three levels allows the wing tips to make the proper orientation whereby the feathers are presented to the pinch rollers. After the process is repeated in the third level, the finished wing tips are discharged out the bottom of the apparatus onto a conveyance system that moves them away to be graded.

Yet another embodiment of the invention includes a frame having a powered drive mechanism mounted thereon. The invention further includes an uppermost pinch roller including an upper left roller and upper right roller each rotateably engaged to the drive mechanism, where the drive mechanism is operable to drive each of the upper left and upper right rollers inwardly and oppositely with respect to the other. Each of the upper left and upper right rollers can have upper left and upper right helical threads respectively where each of the upper left and upper right threads advance from an upper start end of the uppermost pinch roller to an upper exit end of the uppermost pinch roller distal with respect to the upper start end for advancing a segmented wing portion from the upper start end to the upper exit end and along a upper line of engagement between the upper left and upper right rollers and capturing any feathers.

The invention can further include a lower pinch roller aligned vertically below the uppermost pinch roller, where said lower pinch roller includes a lower left roller and a lower right roller each rotateably engaged to the drive mechanism, where said drive mechanism is operable to drive each of the lower left and lower right rollers inwardly and oppositely with respect to the other. Each of the lower left and lower right rollers can have lower left and lower right helical threads respectively where each of said lower left and lower right threads advance from a lower start end to a lower exit end distal with respect to the lower start end for advancing the segmented wing portion from the lower start end to the lower exit end and along a lower line of engagement between lower left and lower right rollers and capturing any feathers. The lower start end and the lower exit end can be vertically aligned beneath the upper exit end and the upper start end respectively.

The invention can further include a lowermost pinch roller aligned vertically below the lower pinch roller, where said lowermost pinch roller including a lowermost left roller and a lowermost right roller each rotateably engaged to the drive mechanism operable to drive each of the lowermost left and lowermost right rollers inwardly and oppositely with respect to the other and each of the lowermost left and lowermost right rollers having lowermost left and lowermost right helical threads respectively. Each of said lowermost left and lowermost right threads advance from a lowermost start end to a lowermost exit end distal with respect to the lowermost start end for advancing the segmented wing portion from the lowermost start end to the lowermost exit end and along a lowermost line of engagement between lowermost left and lowermost right rollers and capturing any feathers. The lowermost start end and the lowermost exit end can be vertically aligned beneath the lower exit end and the lower start end respectively.

The previous inventions were dependent upon the wings remaining on the poultry carcass. With the increasing use of high speed evisceration lines in the poultry industry, the previous invention is rendered obsolete and cannot be used because the high line speed can reduce the effectiveness of the previous methods. This invention allows the wings to be removed from the poultry carcass and segmented before the tip feathers are removed. By this method, the new invention will not be dependent upon the type of evisceration used and cannot be rendered obsolete by any type of first processing. These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 1 is a front perspective view of the multiple tier assembly;

FIG. 5 is a perspective view of a pinch roller pair.

Figure 2:
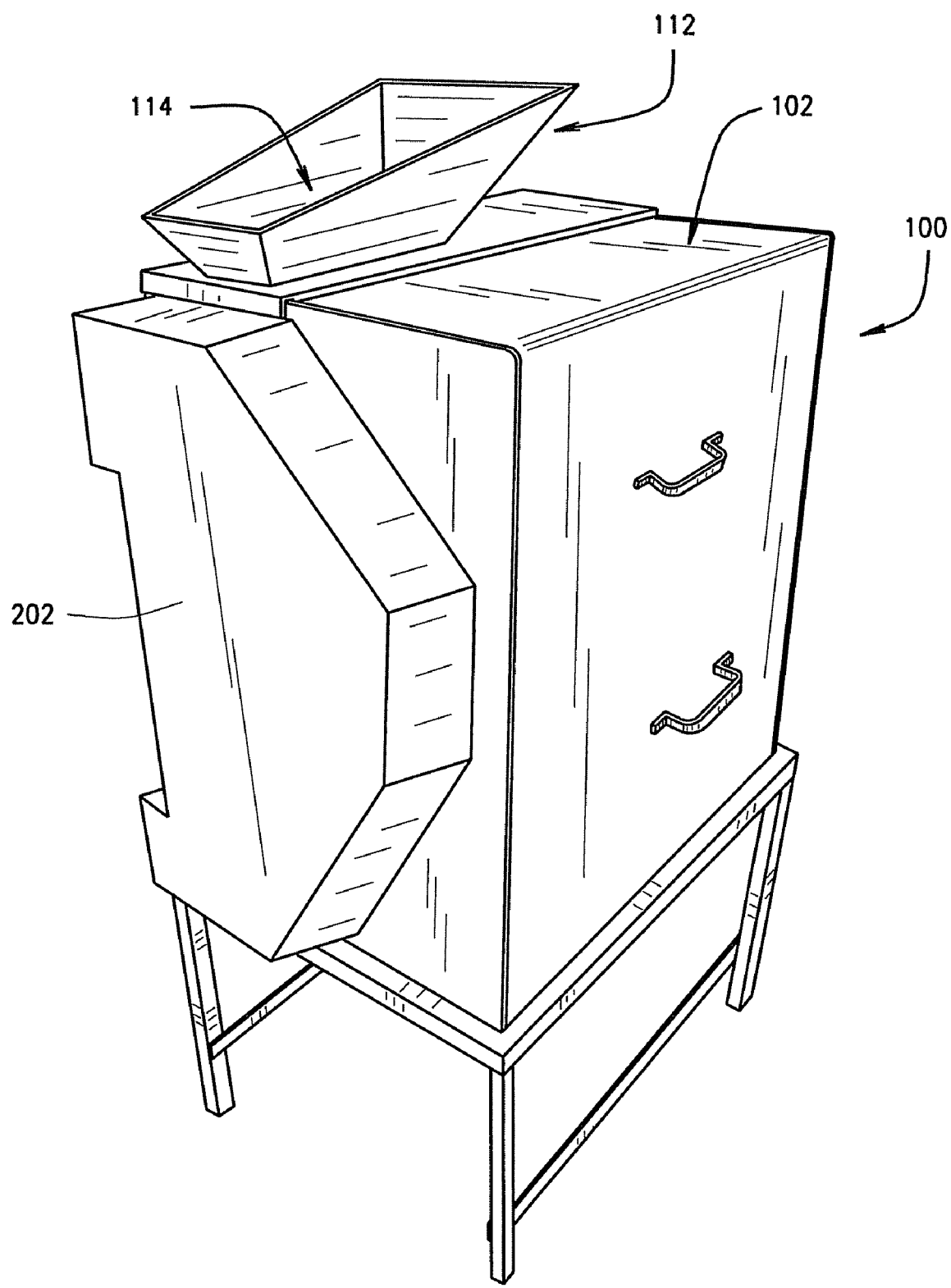
FIG. 2 is a rear perspective view of the multiple tier assembly.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIGS. 1-5 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising a multiple tier pinch roller assembly teaches a novel apparatus and method for removing feather from the tips of poultry wings that have been separated from the carcass.

The details of the invention and various embodiments can be better understood by referring to the figures of the drawing. Referring to FIG. 1, a front perspective view of the multiple tier assembly is shown. This view provides a front perspective view of the feather removing apparatus 100. The feather removing apparatus 100 includes a main frame 102. Rotatively mounted within the frame are the uppermost pinch roller 104, the lower pinch roller 106 and the lowermost pinch roller 108. The lower pinch roller 106 can be powered and driven by a drive mechanism 110. The drive provided by the drive mechanism 110 can be transferred to the uppermost pinch roller 104 and the lowermost pinch roller 108 by a serpentine belt and pulley system not shown in this view. The uppermost chute 112 is shown having a vertically oriented uppermost channel 114 utilized for channeling a segmented wing portion toward the uppermost pinch roller 104.

A feed conveyor, not shown, has a conveyor exit that is vertically aligned above the vertically oriented uppermost channel for dropping a segmented wing portion down through the channel 114. When a segmented wing portion is engaged by the uppermost pinch roller 104, the pinch roller can advance the segmented wing portion along the pinch roller's line of engagement until it is dropped downward to the next tier or the lower pinch roller 106. The chute and trough assembly 116 can be utilized to channel a dropped segmented wing portion downward to engage the lower pinch roller 106. The lower chute and trough assembly 116 can have a lower elongated trough portion 118 for containing the segmented wing portion and promoting engagement of the wing portion of the lower pinch roller 106. The lower elongated trough portion 118 can have a lower left lengthwise sidewall 120 and a lower right lengthwise sidewall 122. The sidewalls 120 and 122 can be angled inwardly from top to bottom one sidewall with respect to the other such that they are adapted to receive and channel the wing tip to engage the lower line of engagement of the lower pinch roller 106.

The lower elongated trough portion 118 of the lower chute and trough assembly 116 can have an elongated lengthwise bottom opening to allow a segmented wing portion to pass through and engage the pinch roller. The lower chute portion 124 can be utilized to channel a segmented wing portion dropped from the uppermost pinch roller toward the lower pinch roller 106. The chute and trough assembly 116 can also have lower retention bars 130 to attach and secure the left and right sidewalls together as well as assist in containing a segmented wing portion. The lower chute portion 124 can have a lower channel which channels the segmented wing portion dropped from the uppermost pinch roller 104. When a segmented wing portion engages the lower pinch roller, it can be advanced along its line of engagement until it is dropped off the far end to be channeled by the lowermost channel 136.

The lower chute and trough assembly 116 can also be designed to be retractable utilizing a lower lever 128 to pivotally retract the lower chute and trough assembly 116 away from the lower pinch roller to be positioned adjacent said pinch roller. The lowermost chute and trough assembly 132 can be utilized in a similar manner as the lower chute and trough assembly 116. The lowermost chute and trough assembly 132 can also include a lowermost chute portion 134 having a lowermost channel 136 for directing the segmented wing portion dropped from the lower pinch roller toward engagement of the lowermost pinch roller. The lowermost chute and trough assembly 132 can also have a lowermost right lengthwise sidewall 138 and a lowermost left lengthwise sidewall. The assembly can also include lowermost retention bars 142 for the same purpose as retention bars 130. In a similar manner, the lowermost chute and trough assembly can be retracted utilizing the lowermost lever 143.

Referring to FIG. 2, a rear perspective view of the multiple tier assembly is shown. This rear perspective view reveals the other side of the feather removing apparatus 100. This view provides a secondary view of mainframe 102 and the uppermost chute 112 having a vertically oriented uppermost channel 114. This view also reveals the assembly containing the serpentine belt and pulley mechanism 202 for transferring drive from the drive mechanism to the uppermost pinch roller and the lowermost pinch roller. This serpentine belt and pulley assembly allows for one drive mechanism to be utilized to power all three tiers of pinch rollers. The power source of the drive mechanism can be an electrical motor or other power source.

Figure 3:
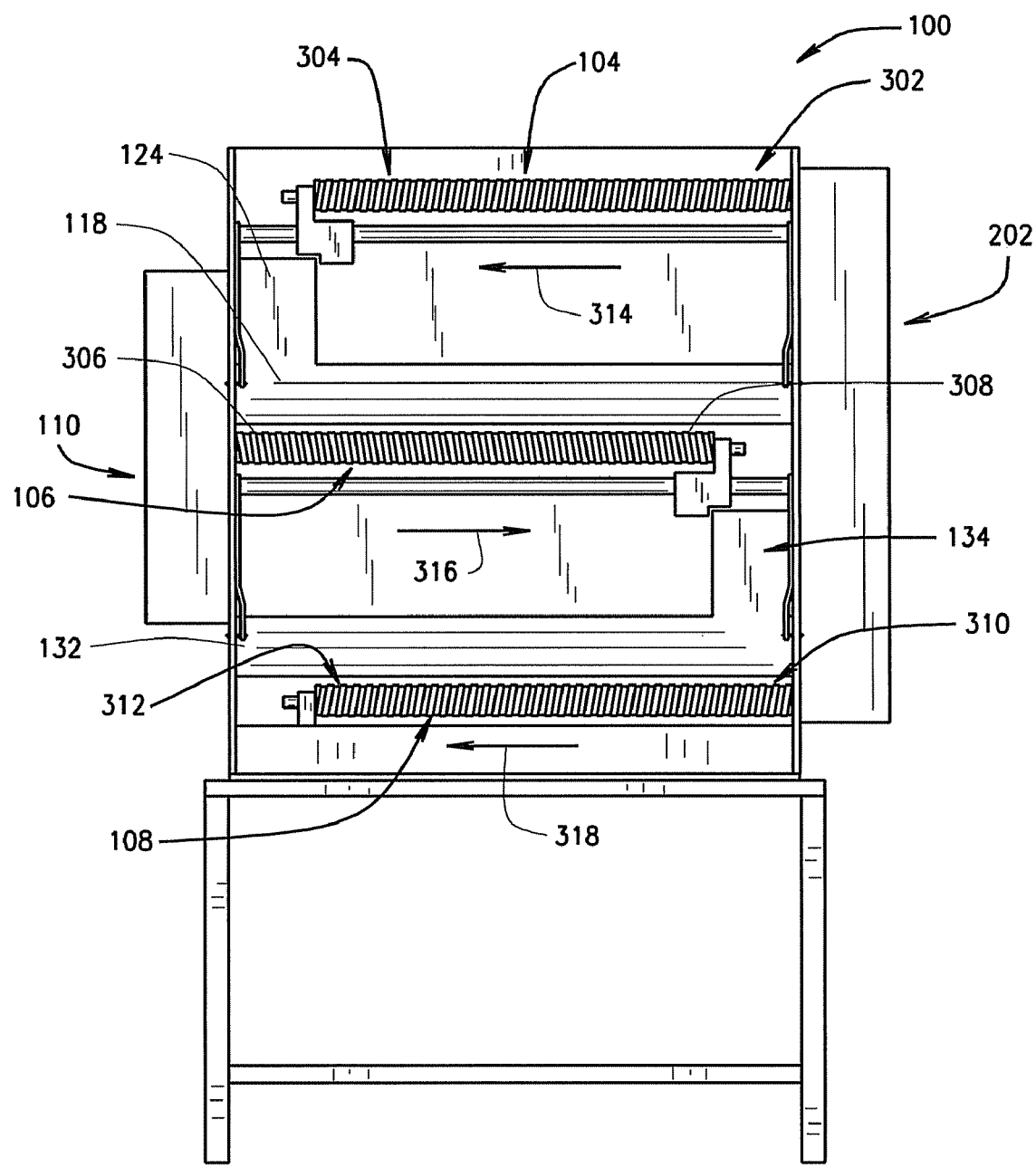
FIG. 3 is a front elevation view of the multiple tier assembly.

Referring to FIG. 3, a front elevation view of the multiple tier assembly is shown. This front elevation view further illustrates the apparatus and method for removing feathers from a segmented wing portion. The feather removing apparatus 100 again is shown having three tiers of pinch rollers 104, 106 and 108. The feather removing apparatus 100 can have two tiers of pinch rollers as an alternative embodiment two tier system rather than having a three-tier system as shown. Further, the feather removing apparatus 100 can add additional tiers of pinch rollers as needed.

As shown by the front elevation view, a segmented wing portion can be directed to engage the upper start end 302 of the uppermost pinch roller whereby the segmented wing portion can be advanced toward the upper exit end 304 of the uppermost pinch roller. The segmented wing portion can be advanced by way of the inward rotation of the left and right rollers of the pinch roller assembly where each of the left and right rollers in the assembly have a helical thread where the helical threads spirally advance along the direction of advancement as indicated by the upper directional arrow 314. The segmented wing portion advances in the same direction as the direction of the spirally advancing helical threads.

A segmented wing portion can be advanced over the upper exit end 304 to drop down the lower chute portion 124 and further channeled and contained by the lower elongated trough portion 118. The lower chute and trough assembly thereby directs and urges the segmented wing portion to engage the lower start end 306 of the lower pinch roller 106. The segmented wing portion can then be advanced in a direction as indicated by the lower directional arrow 316. Again, the rollers of the lower pinch roller 106 can have helical threads that spirally advance in a directed as indicated by the lower directional arrow 316. Therefore, the segmented wing portion is advanced toward the lower exit end 308 of the lower pinch roller 106 similar to the process described above.

The lowermost chute portion 134 and the lowermost elongated trough portion of the chute and trough assembly directs and urges a segmented wing portion to engage the lowermost start end 310 of the lowermost pinch roller 108. In a similar manner as described above, the segmented wing portion can be advanced in a direction as indicated by directional arrow 318 toward the lowermost exit end 312. A segmented wing portion can be advanced over the lowermost exit end 312, thereby dropping from the feather removing apparatus to be captured by a take-away conveyor not shown.

Figure 4:
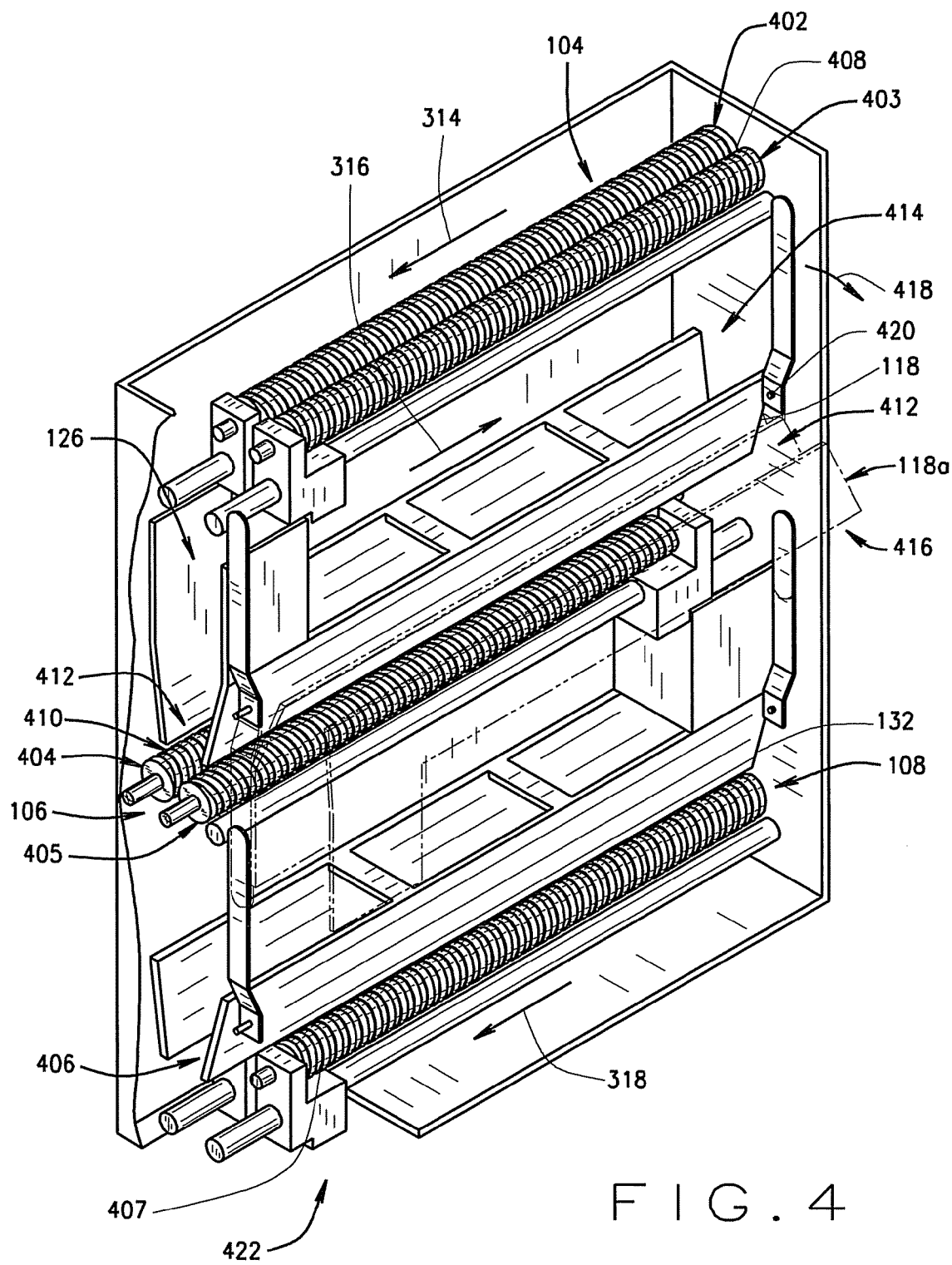
FIG. 4 is a front perspective breakout of the tiered roller pairs.

Referring to FIG. 4, a front perspective breakout of the tiered roller pairs is shown. This perspective view with portions of the assembly cut away further reveals the tiered pinch rollers as well as the chute and trough assemblies. The uppermost pinch roller 104 is shown having an upper left roller and an upper right roller 402 and 403, respectively. The left and right pinch rollers 402 and 403, respectively, can be proximately spaced apart forming a gap there between to define an upper line of engagement 408.

The lateral distances between the rollers can vary thereby varying the aggressiveness of the pinch rollers. The rollers can be aligned adjacently and parallel one with respect to the other. Further, the cylindrical axis of the left and right rollers can lie within the same plane that is substantially horizontal. Each roller can also have a helical thread as further described in FIG. 5. This cutaway view also provides a further illustration of the lower channel 126 which directs a segmented wing portion downward toward the lower pinch roller 106. This cutaway view also reveals the lengthwise bottom opening 412 of the lower chute and trough assembly.

The second tier or lower pinch roller 106 can also have a lower right roller 405 and a lower left roller 404. In a similar manner, the lowermost pinch roller 108 can also have a lowermost left roller generally indicated by 406 and a lowermost right roller 407. The lower pinch roller 106 can also have a lower line of engagement 410 for grasping any feathers remaining on the segmented wing portion. This cutaway view also provides an illustration of the pivoting action of the chute and trough for retraction capability of the chute and trough assembly. The chute and trough assembly can be retracted as indicated by directional arrow 418. This view shows the lower chute and trough assembly in its non-retracted position 414. The broken line illustration of the chute and trough assembly 118a illustrates the chute and trough assembly in a retracted position 416. The retractability of the chute and trough assembly allows for ease of cleaning of the pinch rollers. The directional arrow 418 illustrates the arcual pivoting motion of the chute and trough assembly. The assembly pivots about a pivot point 420. The lowermost chute and trough assembly has a similar pivot point about which the chute and trough assembly pivotally retracts.

When a segmented wing portion has advanced from the lowermost start end of the lowermost pinch roller over the exit end of the pinch roller, the segmented wing portion will fall over the lower most exit end and through the lowermost exit opening 422. When the segmented wing portion falls through the lowermost exit opening, it can then be captured by a takeaway conveyor not shown in this view. Directional arrows 314, 316 and 318 indicate the direction in which the helical threads are advancing and further is the direction of advancement of a segmented wing portion.

Referring to FIG. 5, a perspective view of a pinch roller pair is shown. This figure provides an illustration of the type of pinch roller that is utilized on the present invention. The pinch roller 500 is shown with a left and right roller. The left and right rollers 502 and 504, respectively, are proximately spaced apart forming a small gap there between. The gap between the left and right rollers can remain uniform over the full length of the rollers. The gap between the rollers can define a line of engagement 513 toward which the a roller is inwardly rotated. Each of the rollers rotate inwardly one with respect to the other as indicated by rotational arrows 510 and 512. The left and right rollers can have drive axles 506 and 508.

The helical threads 515 can spirally advance from one end to the other as indicated by direction arrow 522. It is in this direction that the pinch roller advances a segmented wing portion. The helical thread 515 can have a ridge portion of the helical thread 514 and a valley or groove portion 516 of the helical thread. The ridge and valley can vary in width to optimize the conveyance of the segmented wing and the pulling of feathers. For example, one embodiment of the pinch roller can have a thread ridge with a width of about approximately 0.360+−0.005 inches; and a thread valley with a width of about approximately 0.380+−0.005 inches. One embodiment of the helical thread can have for example, about approximately 1.5 inch double pitch. The ridge and groove 514 and 516 of the left roller can be juxtaposed to the groove and ridge 520 and 518 respectively of the right roller. The gap between the rollers can contribute to the aggressiveness of the rollers when pulling feathers from a segmented wing portion. For example, one embodiment of the pinch roller can have a gap of about approximately 0.008+/−0.002 inches.

The various wing tip feather removal examples shown above illustrate novel method and apparatus for removing feathers from a separated wing tip. A user of the present invention may choose any of the above wing tip feather removal embodiment, or an equivalent thereof, depending upon the desired application. In this regard, it is recognized that various forms of the subject wing tip feather removal invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. An apparatus for removing the feathers from a wing tip of a segmented wing portion comprising:

a frame having a powered drive mechanism mounted thereon;

an uppermost pinch roller including an upper left roller and upper right roller each rotateably engaged to the drive mechanism operable to drive each of the upper left and upper right rollers inwardly and oppositely with respect to the other and each of the upper left and upper right rollers having upper left and upper right helical threads respectively where each of the upper left and upper right threads spirally advance from an upper start end to a upper exit end distal with respect to the upper start end for advancing a segmented wing portion from the upper start end to the upper exit end and along a upper line of engagement between the upper left and upper right rollers and capturing any feathers; and a lower pinch roller aligned vertically below the uppermost pinch roller, said lower pinch roller including a lower left roller and a lower right roller each rotateably engaged to the drive mechanism operable to drive each of the lower left and lower right rollers inwardly and oppositely with respect to the other and each of the lower left and lower right rollers having lower left and lower right helical threads respectively where each of said lower left and lower right threads advance from a lower start end to a lower exit end distal with respect to the lower start end for advancing the segmented wing portion from the lower start end to the lower exit end and along a lower line of engagement between lower left and lower right rollers and capturing any feathers, where the lower start end and the lower exit end are vertically aligned beneath the upper exit end and the upper start end respectively.

2. The apparatus for removing the feathers from the wing tip, as recited in claim 1, further comprising:

a lowermost pinch roller aligned vertically below the lower pinch roller, said lowermost pinch roller including a lowermost left roller and a lowermost right roller each rotateably engaged to the drive mechanism operable to drive each of the lowermost left and lowermost right rollers inwardly and oppositely with respect to the other and each of the lowermost left and lowermost right rollers having lowermost left and lowermost right helical threads respectively where each of said lowermost left and lowermost right threads advance from a lowermost start end to a lowermost exit end distal with respect to the lowermost start end for advancing the segmented wing portion from the lowermost start end to the lowermost exit end and along a lowermost line of engagement between lowermost left and lowermost right rollers and capturing any feathers, where the lowermost start end and the lowermost exit end are vertically aligned beneath the lower exit end and the lower start end respectively.

3. The apparatus for removing the feathers from the wing tip, as recited in claim 2, where the ridges of the left uppermost, lower and lowermost helical threads are respectively juxtapose to the grooves of right uppermost, lower and lowermost helical threads.

4. The apparatus for removing the feathers from the wing tip, as recited in claim 3, further comprising:

an uppermost chute having a vertically oriented uppermost channel attached to said frame and vertically aligned above the uppermost start end and adapted to channel the segmented wing portion to engage the uppermost start end of the uppermost pinch roller.

5. The apparatus for removing the feathers from the wing tip, as recited in claim 4, further comprising;

a pivotally retractable lower chute and trough assembly pivotally attached to said frame and including an elongated trough portion vertically aligned above the lower pinch roller when pivoted to a non-retracted position, where said lower chute and trough assembly has an elongated lengthwise extended bottom opening vertically aligned above the lower line of engagement, and where said lower chute and trough assembly include left and right lengthwise side walls angled inwardly from top to bottom one side with respect to the other adapted to receive and channel the wing tip to engage the lower line of engagement and said lower chute and trough assembly positioned along side of the lower pinch roller when pivoted to a retracted position; and said lower chute and trough assembly having a chute portion attached on one end of the chute and trough assembly and having a vertically oriented lower channel vertically aligned beneath the upper exit end and having sufficient diameter to receive the segmented wing portion falling from the uppermost pinch roller and vertically aligned above the lower start end.

6. The apparatus for removing the feathers from the wing tip, as recited in claim 5, further comprising;

a pivotally retractable lowermost chute and trough assembly pivotally attached to said frame and including a lowermost elongated trough portion vertically aligned above the lowermost pinch roller when pivoted to a non-retracted position, where said lowermost chute and trough assembly has a lowermost elongated lengthwise extended bottom opening vertically aligned above the lowermost line of engagement, and where said lowermost chute and trough assembly include lowermost left and right lengthwise side walls angled inwardly from top to bottom one side with respect to the other adapted to receive and channel the wing tip to engage the lowermost line of engagement and said lowermost chute and trough assembly positioned along side of the lowermost pinch roller when pivoted to a lowermost retracted position; and said lowermost chute and trough assembly having a lowermost chute portion attached on one end of the lowermost chute and trough assembly and having a vertically oriented lowermost channel vertically aligned beneath the lower exit end and having sufficient diameter to receive the segmented wing portion falling from the lower pinch roller and vertically aligned above the lowermost start end.

7. The apparatus for removing the feathers from the wing tip, as recited in claim 6, further comprising:

a feed conveyor having a conveyor exit end vertically aligned above the vertically oriented uppermost channel of the uppermost chute and adapted to convey the segmented wing portion toward the conveyor exit end and drop the segmented wing portion down the vertically oriented upper most channel.

8. The apparatus for removing the feathers from the wing tip, as recited in claim 7, further comprising:

a take-away conveyor having a conveyor start end vertically aligned beneath the lowermost exit end and adapted to receive the segmented wing portion dropped from the lowermost exit end of the lowermost pinch roller and convey away said segmented wing portion.

9. The apparatus for removing the feathers from the wing tip, as recited in claim 8, further comprising:

lower retention bars laterally extending between and connecting the upper edges of the lower left and right lengthwise side walls adapted to assist in retaining the segmented wing portion in the lower chute and trough assembly.

10. The apparatus for removing the feathers from the wing tip, as recited in claim 9, further comprising:

lowermost retention bars laterally extending between and connecting the upper edges of the lowermost left and right lengthwise side walls adapted to assist in retaining the segmented wing portion in the lowermost chute and trough assembly.

11. The apparatus for removing the feathers from the wing tip, as recited in claim 10, where the drive mechanism includes a single belt and multiple pulley drive system.

12. The apparatus for removing the feathers from the wing tip, as recited in claim 11, where the drive mechanism includes a single drive motor.

13. The apparatus for removing the feathers from the wing tip, as recited in claim 12, where a width of the ridges of the left uppermost, lower and lowermost helical threads and the valleys of right uppermost, lower and lowermost helical threads are about approximately 0.360+/−0.005 inches; and of about approximately 0.380+/−0.005 inches respectively.

14. The apparatus for removing the feathers from the wing tip, as recited in claim 13, where a gap between the left uppermost, lower and lowermost roller and the right uppermost, lower and lowermost rollers respectively are about approximately 0.008+/−0.002 inches.

15. A method for removing the feathers from a wing tip of a segmented wing portion comprising the steps of:
   providing an uppermost pinch roller having an upper left and an upper right roller having upper left and upper right helical threads respectively where each of the upper left and upper right helical threads spirally advance from an upper start end to a upper exit end distal with respect to the upper start end;
   rotating inwardly and oppositely with respect to the other the upper left roller and the upper right roller of the uppermost pinch roller with a drive mechanism operable to drive each of the upper left and upper right rollers;
   advancing and engaging a segmented wing portion from the upper start end to the upper exit end and along a upper line of engagement between the upper left and upper right rollers;
   capturing and pulling feathers attached to the segmented wing portion between the upper left and upper right rollers;
   providing a lower pinch roller aligned vertically below the uppermost pinch roller, said lower pinch roller including a lower left roller and a lower right roller and vertically aligning the lower start end and the lower exit end beneath the upper exit end and the upper start end respectively;
   rotating inwardly and oppositely one with respect to the other the lower left and lower right rollers with a drive mechanism operable to drive each of the lower left and lower right rollers having lower left and lower right helical threads respectively where each of said lower left and lower right helical threads spirally advance from a lower start end to a lower exit end distal with respect to the lower start end;
   channeling the segmented wing from the upper exit end to the lower start end;
   advancing the segmented wing portion from the lower start end to the lower exit end and along a lower line of engagement between lower left and lower right rollers; and
   capturing and pulling feathers attached to the segmented wing portion between the lower left and lower right rollers.

16. The method for removing the feathers from a wing tip as recited in claim 15, further comprising the steps of:
   providing a lowermost pinch roller aligned vertically below the lower pinch roller, said lowermost pinch roller including a lowermost left roller and a lowermost right roller and vertically aligning the lowermost start end and the lowermost exit end beneath the lower exit end and the lower start end respectively;
   rotating inwardly and oppositely one with respect to the other the lowermost left and lowermost right rollers with the drive mechanism operable to drive each of the lowermost left and lowermost right rollers having lowermost left and lowermost right helical threads respectively where each of said lowermost left and lowermost right helical threads spirally advance from a lowermost start end to a lowermost exit end distal with respect to the lowermost start end;
   channeling the segmented wing from the lower exit end to the lowermost start end;
   advancing the segmented wing portion from the lowermost start end to the lowermost exit end and along a lowermost line of engagement between lowermost left and lowermost right rollers; and
   capturing and pulling feathers attached to the segmented wing portion between the lowermost left and lowermost right rollers.

17. The method for removing the feathers from the wing tip, as recited in claim 16, further comprising the step of:
   providing an uppermost chute having a vertically oriented uppermost channel vertically aligned above the uppermost start end;
   conveying a segmented wing portion on a feed conveyor toward a conveyor exit end vertically aligned above the vertically oriented uppermost channel of the uppermost chute; and
   dropping and channeling the segmented wing portion down the vertically oriented upper most channel to engage the uppermost start end of the uppermost pinch roller.

18. The method for removing the feathers from the wing tip, as recited in claim 17, where advancing with the segmented wing portion is advancing with the ridges of the left uppermost, lower and lowermost helical threads respectively juxtapose to the valleys of right uppermost, lower and lowermost helical threads.

19. The method for removing the feathers from the wing tip, as recited in claim 18, further comprising the steps of:
   dropping the segmented wing portion from the lowermost exit end; and
   capturing and conveying away the segmented wing portion with a take-away conveyor having a conveyor start end vertically aligned beneath the lowermost exit end and adapted to receive the segmented wing portion dropped from the lowermost exit end of the lowermost pinch roller and convey away said segmented wing portion.

20. The method for removing the feathers from the wing tip, as recited in claim 19, further comprising the steps of:
   containing and urging the wing tips to engage the lower pinch roller with a pivotally retractable lower chute and trough assembly pivotally attached to said frame and including an elongated trough portion vertically aligned above the lower pinch roller when pivoted to a non-retracted position, where said lower chute and trough assembly has an elongated lengthwise extended bottom opening vertically aligned above the lower line of engagement, and where said lower chute and trough assembly include left and right lengthwise side walls angled inwardly from top to bottom one side with respect to the other adapted to receive and channel the wing tip to engage the lower line of engagement and said lower chute and trough assembly positioned along side of the lower pinch roller when pivoted to a retracted position.

21. The method for removing the feathers from the wing tip, as recited in claim 20, further comprising the steps of:
   containing and urging the wing tip to engage the lowermost pinch roller with a pivotally retractable lowermost chute and trough assembly pivotally attached to said frame and including a lowermost elongated trough portion vertically aligned above the lowermost pinch roller when pivoted to a lowermost non-retracted position, where said lowermost chute and trough assembly has an elongated lengthwise extended bottom opening vertically aligned above the lowermost line of engagement, and where said lowermost chute and trough assembly include lowermost left and right lengthwise side walls angled inwardly from top to bottom one side with respect to the other adapted to receive and channel the wing tip to engage the lowermost line of engagement and said lowermost chute and trough assembly positioned along side of the lowermost pinch roller when pivoted to a retracted position.

22. The method for removing the feathers from a wing tip, as recited in claim 21, where a width of the ridges of the left uppermost, lower and lowermost helical threads and the valleys of right uppermost, lower and lowermost helical threads are about approximately 0.360+/−0.005 inches; and of about approximately 0.380+−0.005 inches respectively.

23. The method for removing the feathers from a wing tip, as recited in claim 22, where a gap between the left uppermost, lower and lowermost roller and the right uppermost, lower and lowermost rollers respectively are of about approximately 0.380+−0.005 inches respectively.

24. A method for removing feathers from a wing tip of a segmented wing portion comprising the steps of:

passing a segmented wing portion over a plurality of pinch rollers along their respective lines of engagement including the steps of sequentially passing the segmented wing portion over an upper most pinch roller, a lower pinch roller and a lowermost pinch roller and sequentially dropping the segmented wing portion to engage the upper most pinch roller, the lower pinch roller and the lowermost pinch roller.

25. An apparatus for removing feathers from a wing tip of a segmented wing portion comprising:

a feather picking assembly having a plurality of tiered pinch rollers each sequentially tiered from an uppermost pinch roller to a lowermost pinch roller and vertically aligned below a feed conveyor position above the feather picking assembly and operable to feed segmented wing portions into the feather picking assembly thereby engaging the uppermost pinch roller, where each pinch roller tier below the uppermost pinch roller has an entrance end vertically aligned below the exit end of the tier immediately above; and a separate chute positioned between each pinch roller tier that is below the uppermost pinch roller and the pinch roller tier immediately above, where the separate chute extends between the entrance end of each pinch roller tier that is below the uppermost pinch roller and the exit end of the pinch roller tier immediately above.

\* \* \* \* \*